(12) United States Patent
Baruch

(10) Patent No.: US 6,570,980 B1
(45) Date of Patent: May 27, 2003

(54) METHOD OF DISTRIBUTING TELEPHONE CALLS TO ORDERED AGENTS

(75) Inventor: Sauveur Baruch, Daoulas (FR)

(73) Assignee: Alcatel, Paris (FR)

( * ) Notice: Subject to any disclaimer, the term of this patent is extended or adjusted under 35 U.S.C. 154(b) by 360 days.

(21) Appl. No.: 09/634,985

(22) Filed: Aug. 8, 2000

(30) Foreign Application Priority Data

Oct. 11, 1999 (FR) .............................. 99 12636

(51) Int. Cl.[7] .............................. H04M 3/523
(52) U.S. Cl. .................... 379/265.12; 379/265.13; 379/266.02
(58) Field of Search ............... 379/265.01, 265.02, 379/265.11, 265.12, 265.13, 266.01, 266.02, 266.04, 266.05, 309

(56) References Cited

U.S. PATENT DOCUMENTS 5,825,869 A * 10/1998 Brooks et al. ......... 379/265.12
6,130,942 A * 10/2000 Stenlund .................... 376/266
6,173,053 B1 * 1/2001 Bogart et al. .......... 379/265.02
6,222,918 B1 * 4/2001 De Kouchkovsky et al. 379/114.02

FOREIGN PATENT DOCUMENTS

| EP | 0 740 450 A2 | 10/1996 | ............ 379/265.12 |
| EP | 0 835 016 A1 | 4/1998 | ............ 379/265.13 |
| EP | 0 949 794 A1 | 10/1999 | ............ 379/266.01 |

* cited by examiner

Primary Examiner—Harry S. Hong
(74) Attorney, Agent, or Firm—Sughrue Mion, PLLC

(57) ABSTRACT

A method of distributing telephone calls to provide users of extensions and/or terminals of a telecommunications network with access to a service provided by an agent includes the steps of determining agent profiles, determining a call profile, comparing the call profile to the agent profiles to constitute an ordered list of agents qualified to process a call, and distributing a call to agents from the list of agents.

12 Claims, 2 Drawing Sheets

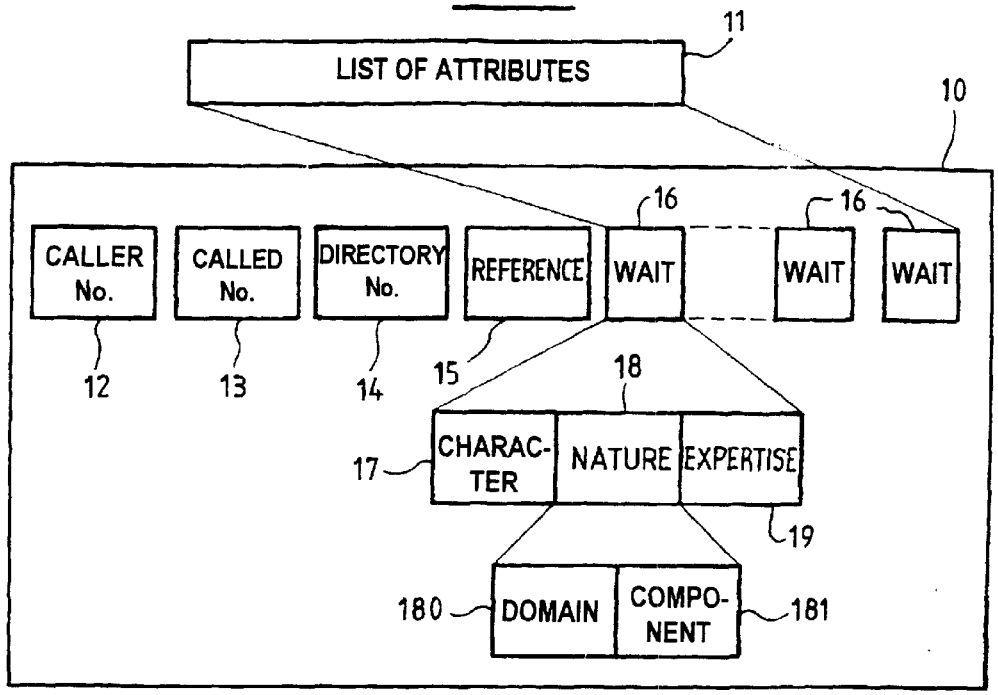
FIG_1
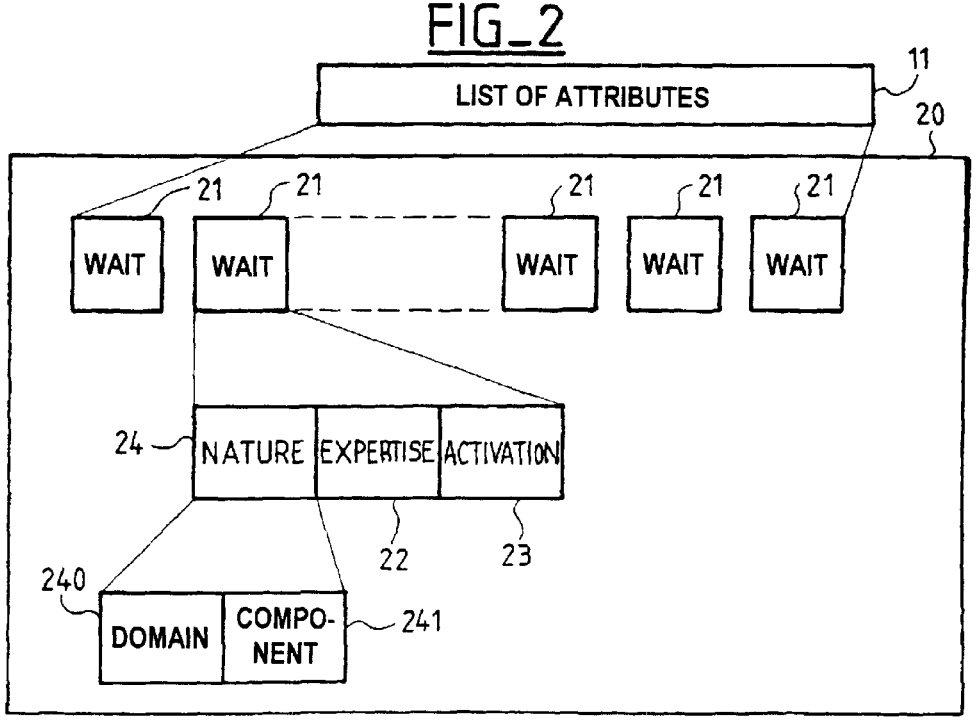
FIG_2

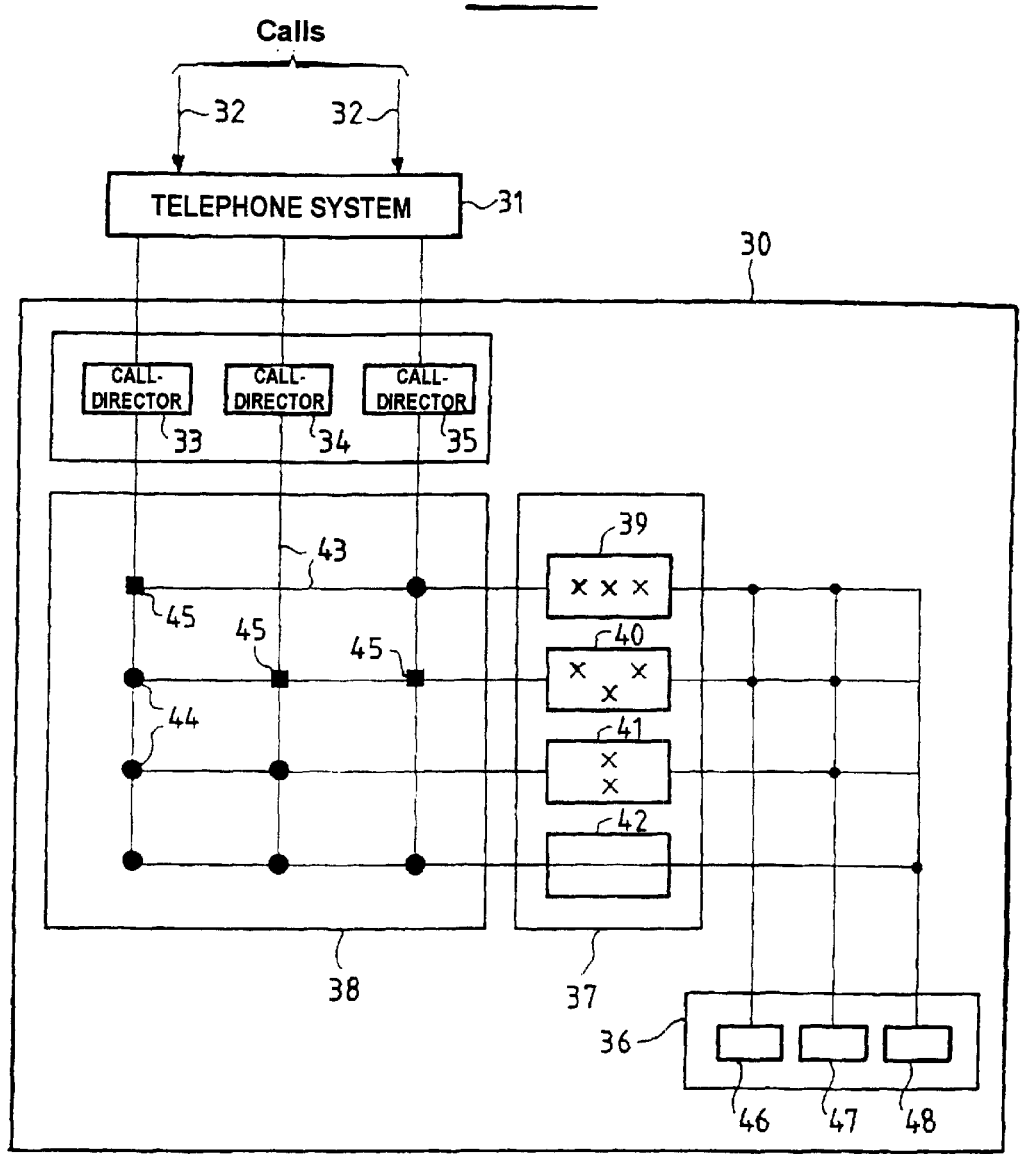

METHOD OF DISTRIBUTING TELEPHONE CALLS TO ORDERED AGENTS

BACKGROUND OF THE INVENTION

1. Field of the Invention

The invention relates to a call distribution method. The call distribution method according to the invention can be used in a network usually including one or more interconnected telephone exchanges to which telephone terminals or extensions are connected. Some of the telephone terminals or extensions are used to respond to telephone calls from users requesting services or information. The calls are set up via interface circuits which enable user terminals or extensions to communicate with a call distribution facility used by the method according to the invention.

2. Description of the Prior Art

Call distribution methods have changed greatly since they were first introduced. Nowadays, the systems which implement them usually include a large software component. They are integrated into telephone exchanges, more particularly into private branch exchanges. These private branch exchanges are made available to companies whose employees and customers are often the users. Many companies are therefore able to provide very sophisticated services or information on demand.

Call distribution facilities are therefore often a means of direct communication between companies and their customers. The quality of service that they offer therefore makes a great contribution to the appreciation of the company by its customers. The essential function of the various call distribution methods is to route telephone calls to an operator able to respond to the need.

Various criteria can come into play during the operations which distribute a call to an operator via a call distribution facility. The purpose of the call or the time for which the caller has already been waiting are routinely taken into account. The operating personnel responsible for supervising a call distribution facility use various criteria to provide the best possible response to the caller's enquiry, allowing for the processing capacity, manpower and machine capacity available at the time. Obviously a call distribution facility must answer a call as quickly as possible.

Prior art call distribution methods include methods using distribution facilities organized with different queues so that callers can be distributed according to the availability of operators and priorities can be assigned to callers according to how long their respective calls have been waiting.

There are also automatic call distribution solutions which globally optimize the processing of calls to processing groups made up of several agents having similar skills. However, these automatic distribution solutions do not offer a refined selection of the most appropriate agents for the caller and their particular characteristics.

Prior art intelligent call routers use various criteria to select one or more agents particularly suitable for the expectations of a caller. However, they are incapable of achieving an optimum distribution in terms of waiting time if there is no agent able to respond to a caller immediately.

To alleviate these various problems, the invention proposes a method of automatically distributing calls to agents having skills best suited to the expectations of callers, combined with a very fast response.

To this end, the method according to the invention uses a step of characterizing callers. A call profile is established for each call received so that it is possible to flag a caller and their expectations by assigning them a number of attributes. Each agent has defined their skills beforehand and a supervisor of the distribution facility has a set of agent profiles. Each agent profile contains essential characteristics of an agent who is then associated with a set of attributes. Accordingly, each caller and each agent are defined by a respective set of attributes, preferably on the basis of a single list of available attributes. An ordered list of agents qualified to respond to the call is drawn up for each call. The ordered list of agents allows for the call profile and the attributes of each agent and a hierarchy is established in the ordered list of agents who can answer the call on the basis of a calculation method referred to as cost calculation.

The ordered list of agents is transmitted to a call distribution facility. In one preferred application of the invention the method of the invention uses a distribution facility of the type described in French patent application 96 12184. That distribution facility is hereby incorporated by reference into the present document and is not described in detail hereinafter. It further proposes:

primary distribution first means for selecting a transit unit for a call reaching a call-director, the selection being made as a function of a minimum cost obtained by comparing costs established on the basis of indications characteristic of the present situations of each of the transit units capable at that time of being put into communication with said call-director;

downstream secondary distribution second means for selecting a processing group for a call that has reached a transit unit that was previously empty of calls; the selection being as a function of a minimum cost obtained by comparing costs established on the basis of indications characteristic of the present situations of each of the processing groups capable at that time of being put into communication with said transit unit;

upstream secondary distribution third means for selecting a transit unit for processing a call waiting in said unit as soon as an agent becomes available for processing, selection being as a function of a maximum cost obtained by comparing costs established on the basis of indications characteristic of the situations present in each of the transit units capable at that time of being put into communication with the processing group of which the available agent forms a part; and tertiary distribution fourth means for selecting an available agent in a processing group to take account of a call coming from a transit unit, on the basis of indications characteristic of the situation present in the processing group with which said transit unit has been put into communication.

A particular call distribution architecture for implementing the method according to the invention is also proposed.

SUMMARY OF THE INVENTION

The invention therefore provides a method of distributing telephone calls to provide users of extensions and/or terminals of a telecommunications network with access to a service provided by an agent or operator, the method using a call-director which receives telephone calls which access a service and can use various modes associated with different routing directions, which routing directions can associate with each call a pseudo-queue, or a waiting room, or a queue, a group of processing operators and a transit unit for calls received via a call-director and awaiting processing by an operator, the method including the steps of determining agent profiles, determining a call profile, comparing the call profile to the agent profiles to constitute an ordered list of agents qualified to process a call, and distributing a call to agents from the list of agents.

The transit units employed in the call distribution facility used by the method according to the invention can be of various types: there can be waiting rooms, queues or pseudo-queues.

A queue is used to hold calls awaiting processing temporarily and if necessary before processing of the calls is started by operators of a processing set. The order in which calls parked in a queue are passed to the processing system can be of the first-in/first-out type, so that the order of arrival of the calls is preserved.

A waiting room is also used to hold calls awaiting processing temporarily. Unlike a queue, however, the order in which calls parked in a waiting room are passed to the processing system is not of the first-in/first-out type, but depends on a mechanism described below.

A pseudo-queue is used for calls which do not in fact have to wait, because of how they will be processed. A pseudo-queue is used, for example, for calls to be rerouted and for calls whose continuation is to be discouraged. Such calls are usually switched to an answering system which uses a spoken message to discourage callers, for example to ask them not to call back before a particular time period because the processing system is overloaded.

In one particular application of the invention, a call-director can adopt various modes associated with different routing directions. If a call reaching a call-director is allocated a call profile, the call-director is said to be in open mode. On the other hand, if for any reason, for example saturation of the means for allocating a call profile, a call reaching a call-director cannot be allocated a call profile, the call-director is said to be in blocked mode. Accordingly, a call-director in open mode distributes calls to routing directions associated either with pseudo-queues or with waiting rooms and a call-director in blocked mode distributes calls to routing directions associated either with pseudo-queues or with queues. Routing directions associated with a queue and routing directions associated with a waiting room can be preferred or back-up routing directions that never co-exist in the same mode.

In a preferred configuration of the call distribution facility used by the method according to the invention, a waiting room can be used by more than one call-director and a waiting room can be served by more than one distribution direction.

Various aspects and advantages of the invention will become more clearly apparent in the course of the following description, which is given with reference to the accompanying drawings, which are provided entirely by way of non-limiting and illustrative example of the invention.

BRIEF DESCRIPTION OF THE DRAWINGS

FIG. 1 shows the structure of a call profile.

FIG. 2 shows the structure of an agent profile.

FIG. 3 is a diagram showing a call distribution facility used by the method according to the invention.

DETAILED DESCRIPTION OF THE PREFERRED EMBODIMENT

Referring to FIG. 1, a call profile 10 is essentially characterized by a set of attributes 16 chosen from a list 11 of attributes. A call profile can also include information relating to a caller number 12, a called number 13, an agent directory number 14 in the case of a direct call to a specific agent, or a reference 15 enabling direct identification of the call.

Each attribute 16 of the call profile 10 can be optional or mandatory. For each attribute 16, this information is held in a first field 17 referred to as the character field. A second field 18 is dedicated to the nature of the attribute and a third field 19, referred to as the expertise field, is used to specify a level of expertise for the call.

The second field 18-dedicated to the nature of the attribute includes a domain identifier 180 and a component identifier 181. Examples of different domains are a language, a service, a product. French and English are components of the language domain. "Direct line" or a specific information heading are components of the service domain. The method of the invention offers 20 domains and up to 1,000 components for all the attrubutes. The level of expertise can vary from 1 to 9 for example.

Referring to FIG. 2, an agent profile 20 is characterized by a set 21 of attributes. The set 21 of attributes is preferably chosen from the list 11 of attributes which was also the basis of the set of attributes used to constitute a call profile.

Each attribute of the agent profile is associated with three separate fields: a first field 22 corresponds to the level of expertise of the agent. A second field 23, referred to as the activation field, indicates whether the attribute is active or not. If the attribute is not active, the agent does not give priority to calls requiring that attribute. A third field 24 of the agent profile is dedicated to the nature of the attribute. Just like the field 18 of the call profile, the third field 24 of the agent profile includes a domain identifier 240 and a component identifier 241 which have the same function as the domain identifiers 180 and the component identifiers 181 defined for the call profile.

The attributes of an agent profile are usually allocated to it by a supervisor responsible for managing the whole of the call distribution process. The supervisor can modify the call profiles as they see fit from a call center supervisor (CCS) station, which consists of software executed on a private branch exchange type machine.

The call distribution method according to the invention draws up an ordered list of agents who can answer the call on the basis of the call profile and the agent profiles. The method according to the invention uses a selection mechanism which can detect all the agents having the necessary attributes and a level of expertise as close as possible to that required by the caller.

The calculation method for ordering the agents selected in this way is based on a calculation referred to as the cost calculation. The cost calculation operation is effected for each agent in the list of agents who can answer the call. The cost of an agent allows for the sum of the differences between the expertise level of an attribute required in the call profile and the level of the same attribute in the agent profile. Two costs are calculated for each agent: a cost corresponding to the mandatory attributes of the call profile, and a cost corresponding to the optional attributes of the call profile. The second cost is used to distinguish between agents having the same mandatory attributes cost. Literal expressions for these various cost calculations can be as follows, for example:

Mandatory cost=$|(Nag(O)-Nap(O))|*D$

Optional cost=$|Nag(f)-Nap(f))|*D$ where:

D is the weight of the nature of the attribute; different attributes can therefore have a greater or lesser importance; attributes considered essential are allocated a high weight and the others are allocated a lower weight;

Nap(O) is the expertise level of mandatory attribute O of the call profile,

Nag(O) is the expertise level of the same attribute O of the agent profile,

Nap(f) is the expertise level of optional attribute f of the call profile, and

Nag(f) is the expertise level of the same optional attribute f of the agent profile.

The method of the invention therefore gives priority to selecting the agent whose skills are closest to the requirements of the caller. An expert gives priority to calls requiring a high level of expertise. Calls that do not require a high level of expertise are handled by less expert agents.

The ordered list of agents is then preferably processed in accordance with a call center distribution (CCD) described in French patent application 96 12184. A priority corresponding to the call and a time-delay for reselecting and rerouting the call are also taken into account by the distribution mechanism. At the end of a reselection time-delay the distribution used to implement the method according to the invention may require a new list of agents. In this case, a new step of selecting agents, referred to as expanded selection, is effected: a new and expanded list of agents is drawn up. It takes into account agents having skills corresponding to the mandatory attributes of the call profile but with lower levels of expertise than those initially required. In the case of an overload in the call center, this mechanism expands the capacity to respond to the call to include agents having a lower level of expertise.

The call distribution facility 30 shown diagrammatically in FIG. 3 receives incoming (or possibly outgoing) telephone calls via telephone and/or mobile telephone terminals of a telecommunication network or telephone system 31. The network is based on a telephone exchange, for example, or a plurality of interconnected telephone exchanges. The network 31 includes a plurality of interface circuits 32, for example, through which the calls are transmitted, for example using methods known in the art such as direct inward routing or direct inward dialing. Whatever form of selection is envisaged, calls reaching the call distribution facility 30 are directed to welcome call-directors.

FIG. 3 shows three different welcome call-directors 33, 34 and 35. Each call-director is allocated to a particular service and handles calls to that service. The services concerned are, for example, a reservation service for a transport or vehicle company, a telephone service providing customers with direct access to a number of telesales operations, a service of a bank network or a network of any other company equipped accordingly.

Because callers' questions can be very varied, there are various possibilities for responding, and these will now be described. The responses are provided through a processing system 36. All the call-directors are served by a routing direction unit 38. Calls reaching the call distribution facility 30 via the call-directors pass through the routing direction unit 38 and an intermediate system 37 which enables calls to be parked, if necessary, before they are processed by the processing system 36. The intermediate system 37 in FIG. 3 is made up of various transit units such as a queue 39, a first waiting room 40, a second waiting room 41 and a pseudo-queue 42. To implement the method according to the invention, any other structure can obviously be envisaged for the intermediate system 37.

All telephone calls received via a call-director undergo a first phase of distribution to orient them to a transit unit of the intermediate system 37.

Different routing directions can associate with each call a pseudo-queue, a waiting room, or a queue. Each call-director can use various modes associated with different routing directions. Accordingly, as previously mentioned, a call-director in open mode distributes calls to routing directions associated either with pseudo-queues or with waiting rooms. A call-director in blocked mode distributes calls to routing directions associated either with pseudo-queues or with queues. A routing direction associated with a queue and a routing direction associated with a waiting room can be referred to as preferred or back-up routing directions without ever coexisting in the same mode.

FIG. 3 symbolizes different routing directions by means of vertical and horizontal segments 43. The vertical and horizontal segments can have either circles 44 or squares 45 where they intersect.

A circle 44 at the intersection of a horizontal segment and a vertical segment indicates that the routing direction including the vertical segment above the circle and the horizontal segment to the right of the circle constitutes a preferred routing direction between the call-director aligned with said vertical segment and a module of the intermediate system 37 aligned with said horizontal segment. A routing direction is a preferred routing direction if a call-director which uses that routing direction is in open mode.

A square 40 at the intersection of a horizontal segment and a vertical segment indicates that the routing direction including the vertical segment above the square and the horizontal segment to the right of the square constitutes a back-up routing direction between the call-director aligned with said vertical segment and the module of the intermediate system 37 aligned with said horizontal segment. A routing direction is a back-up routing direction if a call-director which uses that routing direction is in open mode.

Thus in FIG. 3 the first call-director 33 uses routing directions which preferably send calls to the first waiting room 40, the second waiting room 41 or the pseudo-queue 42. The first call-director 33 uses back-up routing directions which send calls to the queue 39.

The second call-director 34 uses routing directions which preferably send calls to the second waiting room 41 and to the pseudo-queue 42. The second call-director 34 uses back-up routing directions which send calls to the first waiting room 40.

The third call-director 35 uses routing directions which preferably send calls to the queue 39 and the pseudo-queue 42. The third call-director 34 uses back-up routing directions which send calls to the first waiting room 40.

On leaving the intermediate system 37, calls are passed to the processing system 36. The processing system 36 is essentially made up of a group of local agents 46, a group of remote agents 47 and a routing operator 48. The remote agents are agents of the distribution facility who are not physically located at the place at which the call is received. In FIG. 3, calls from the queue 39 can be routed either to the local agents 46 or to the remote agents 47. Calls from the first waiting room 40 can be routed either to the local agents 46 or to the remote agents 47. Calls from the second waiting room 41 can be routed to the remote agents 47 and calls from the pseudo-queue 42 are routed only to the routing operator 48.

Other routing directions can obviously be chosen to implement the method of the invention. However, in all cases, a routing direction associated with a queue and a routing direction associated with a waiting room can be preferred or back-up routing directions without ever coexisting in the same mode. A waiting room can serve more than one call-director. A waiting room can be served by more than one distribution direction. In the context of distribution in normal mode, calls having a call profile are routed from the call-director to a waiting room or a pseudo-queue by a routing algorithm.

In the case of routing to a waiting room, call distribution is effected in three steps.

A first step consists of routing the call. A call having a profile is routed to a routing direction according to the result of a cost calculation performed by a routing algorithm. A waiting room or a pseudo-queue is therefore allocated to the call. The cost calculation performed by the routing algorithm is based on calculating a cost which depends on the priority of the routing direction, how full the waiting room is, an average transit time of calls in the waiting room and an average transit time handicap associated with the routing direction. The saturation of a waiting room is measured by comparing the average waiting room transit time with a maximum waiting time for each waiting room. The minimum cost indicates the direction that is given the highest priority.

In a second step resources are selected. In this second step each call entering a waiting room and which has previously been associated with a call profile initiates an agent selection operation. A list of agents is then drawn up. It includes:

agents able to process the call accompanied by a cost associated with each agent for that call; for equal costs, the agent with the longest idle time is chosen;

a priority indicated by a digit from 0 to 9; this optional parameter expresses the order in which calls must be processed in the situation where a call is put on hold; if the priority is not transmitted, the priority during a third step of call selection by the agent will correspond to the value of the call selection priority of the distribution direction between the waiting room and the agent processing group to which the agent is assigned; and an optional time-delay parameter associated with the call. This parameter enables a new list of agents to be chosen for the call or the priority value of the call to be changed at the end of the time-delay; if there are no agents corresponding to the profile of the call to be processed, the call is removed from the waiting room to be redistributed in the next routing direction or redirected to another call-director.

In a third step calls are selected by an agent. When an agent returns to the idle mode, a call selection is effected. This enables the agent to process the call with the highest priority from the calls waiting in queues or waiting rooms. To establish the list of calls to which a call selection algorithm must be applied, the agent takes account of the last interruptible call of each queue that the agent services and the calls from all the waiting rooms which have the agent currently performing the call selection phase in their respective list of agents. By "interruptible call" is meant any call which at the time is not routed to a recorded message which has not been completed, for example.

The call selection algorithm then identifies the call with the highest priority. Calls with the same priority are distinguished by two criteria: the lower cost and the difference between the real waiting time and a shortest real waiting time handicap. The distribution process supervisor designates which of these two criteria has the higher priority.

There is claimed:

1. A method of distributing telephone calls to provide users of a telecommunications network with access to a service provided by an agent or operator, said method using a call-director which receives telephone calls which access the service and can use various modes associated with different routing directions that can associate with each call a pseudo-queue, or a waiting room, or a queue, a group of processing operators and a transit unit for calls received via the call-director and awaiting processing by an operator, the method comprising:

determining agent profiles;

determining a call profile;

preparing an ordered list of agents able to process the call by performing a cost calculation that establishes a first cost corresponding to mandatory attributes of said call profile and a second cost corresponding to optional attributes of said call profile;

comparing said call profile to said ordered list of agents; and distributing the call to at least one agent from said list of agents.

2. The telephone call distribution method claimed in claim 1 wherein said call profiles and said agent profiles comprise particular attributes chosen from a single list of attributes.

3. The telephone call distribution method claimed in claim 1 wherein an attribute of a call profile comprises a character field, a field dedicated to the nature of said attribute of said call profile, and an expertise field.

4. The telephone call distribution method claimed in claim 1 wherein an attribute of an agent profile comprises an expertise field, an activation field and a field dedicated to the nature of said attribute of said agent profile.

5. The telephone call distribution method claimed in claim 1 wherein an expanded list of agents is drawn up at the expiry of a reselection time-delay.

6. The telephone call distribution method claimed in claim 1 wherein a call-director in open mode distributes calls to routing directions associated either with pseudo-queues or with waiting rooms.

7. The telephone call distribution method claimed in claim 1 wherein a call-director in blocked mode distributes calls to routing directions associated either with pseudo-queues or with queues.

8. The telephone call distribution method claimed in claim 1 wherein the routing directions associated with a queue and the routing directions associated with a waiting room can be preferred or back-up routing directions without ever coexisting in the same mode.

9. The telephone call distribution method claimed in claim 1 wherein a waiting room can serve more than one call-director.

10. The telephone call distribution method claimed in claim 1 wherein a waiting room can be served by more than one routing direction.

11. The telephone call distribution method claimed in claim 1 wherein said first cost corresponding to mandatory attributes is calculated by $$|(Nag(O)-Nap(O))|*D$$

wherein

D is the weight of the nature of the mandatory attribute O;

Nag(O) is the expertise level of the mandatory attribute O of the agent profile; and Nap(O) is the expertise level of the mandatory attribute O of said call profile.

12. The telephone call distribution method claimed in claim 1 wherein said second cost corresponding to optional attributes is calculated by $$|(Nag(f)-Nap(f))|*D$$

wherein

D is the weight of the nature of the optional attribute f;

Nag(f) is the expertise level of the optional attribute f of the agent profile; and Nap(f) is the expertise level of the optional attribute f of said call profile.

\* \* \* \* \*